United States Patent
Lai et al.

(10) Patent No.: US 9,780,436 B2
(45) Date of Patent: Oct. 3, 2017

(54) TRANSFORMABLE MOBILE DEVICE

(71) Applicant: Quanta Computer Inc., Taoyuan (TW)

(72) Inventors: Chun-Nan Lai, Taoyuan (TW); Chun-I Lin, Taoyuan (TW); Hui Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 67 days.

(21) Appl. No.: 14/838,765

(22) Filed: Aug. 28, 2015

(65) Prior Publication Data

US 2017/0012342 A1 Jan. 12, 2017

(30) Foreign Application Priority Data

Jul. 9, 2015 (TW) .............................. 104122257 A (51) Int. Cl.
*H01Q 1/24* (2006.01)
*H01Q 1/22* (2006.01)
*H01Q 21/28* (2006.01)

(52) U.S. Cl.
CPC ........... *H01Q 1/2266* (2013.01); *H01Q 21/28* (2013.01)

(58) Field of Classification Search
CPC ........ H01Q 1/243; H01Q 1/38; H01Q 9/0421; H01Q 1/42
USPC .......................... 343/702, 700 MS, 872, 878
See application file for complete search history.

(56) References Cited

U.S. PATENT DOCUMENTS

| | | |
|---|---|---|
| 2013/0016013 A1 | 1/2013 | Wong et al. |
| 2014/0015728 A1* | 1/2014 | Anguera Pros .......... H01Q 9/06 343/843 |
| 2014/0097993 A1* | 4/2014 | Hotta ..................... H01Q 1/243 343/702 |
| 2014/0210685 A1 | 7/2014 | Chang et al. |

FOREIGN PATENT DOCUMENTS

TW 201431177 8/2014

OTHER PUBLICATIONS

Chinese language office action dated Jun. 20, 2016, issued in application No. TW 104122257.

* cited by examiner

*Primary Examiner* — Dameon E Levi
*Assistant Examiner* — Collin Dawkins
(74) *Attorney, Agent, or Firm* — McClure, Qualey & Rodack, LLP (57) ABSTRACT

A transformable mobile device operating in a notebook mode or a tablet mode is provided. The transformable mobile device includes a base, an upper cover, a hinge, a main antenna, and a ground metal plane. The hinge is connected between the base and the upper cover. The main antenna is disposed in the upper cover. The ground metal plane is disposed in the base, or on an outer surface of the base. The ground metal plane includes a main portion and a float portion. The float portion is completely separate from the main portion.

9 Claims, 8 Drawing Sheets

TRANSFORMABLE MOBILE DEVICE

CROSS REFERENCE TO RELATED APPLICATIONS

This application claims priority of Taiwan Patent Application No. 104122257 filed on Jul. 9, 2015, the entirety of which is incorporated by reference herein.

BACKGROUND OF THE INVENTION

Field of the Invention

The disclosure generally relates to a transformable mobile device, and Specifically, to a transformable mobile device with high antenna gain.

Description of the Related Art

With the progress of mobile communication technology, mobile devices such as portable computers, mobile phones, tablet computers, multimedia players, and other hybrid functional mobile devices have become common. To satisfy the demand of users, mobile devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi and Bluetooth systems and using frequency bands of 2.4 GHz, 5.2 GHz, and 5.8 GHz.

Antennas are indispensable components for mobile devices supporting wireless communication. However, antennas tend to be affected by nearby metal elements. For example, when transformable mobile devices operate in different modes, their relative positions of inner antenna elements and metal elements are changed, such that the antenna elements are affected and the total communication quality is degraded accordingly. As a result, there is a need to propose a novel solution for overcoming the problem of the prior art.

BRIEF SUMMARY OF THE INVENTION

In a preferred embodiment, the disclosure is directed to a transformable mobile device operating in a notebook mode or a tablet mode. The transformable mobile device includes a base, an upper cover, a hinge, a main antenna, and a ground metal plane. The hinge is connected between the base and the upper cover. The main antenna is disposed in the upper cover. The ground metal plane is disposed in the base, or on an outer surface of the base. The ground metal plane includes a main portion and a first float portion. The first float portion is completely separate from the main portion.

In some embodiments, the ground metal plane is a metal back cover of the base, or is a system ground plane in the base.

In some embodiments, the main portion has a first notch. The first float portion is disposed in the first notch. A width of a first gap between the first float portion and the main portion is from about 2 mm to about 5 mm.

In some embodiments, the base includes a keyboard, and the upper cover includes a display device. The main antenna is disposed between the display device and an edge of the upper cover.

In some embodiments, when the transformable mobile device operates in the tablet mode, the upper cover is rotated to be below the base and to be substantially parallel to the ground metal plane, such that the main antenna is close to the first float portion.

In some embodiments, a length of the first float portion is substantially equal to 0.25 wavelength of a central operation frequency of the main antenna.

In some embodiments, when the transformable mobile device operates in the tablet mode, the main antenna has a vertical projection on the ground metal plane, and the vertical projection is completely inside the first float portion.

In some embodiments, when the transformable mobile device operates in the tablet mode, mutual coupling is induced between the first float portion and the main antenna, so as to enhance gain of the main antenna.

In some embodiments, the transformable mobile device further includes an auxiliary antenna. The auxiliary antenna is disposed in the upper cover. The ground metal plane further includes a second float portion. The second float portion is completely separate from the main portion. When the transformable mobile device operates in the tablet mode, the upper cover is rotated to be below the base and to be substantially parallel to the ground metal plane, such that the auxiliary antenna is close to the second float portion. A length of the second float portion is substantially equal to 0.25 wavelength of a central operation frequency of the auxiliary antenna.

In some embodiments, the main portion also has a second notch. The second float portion is disposed in the second notch. The width of a second gap between the second float portion and the main portion is from about 2 mm to about 5 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Figure 1:
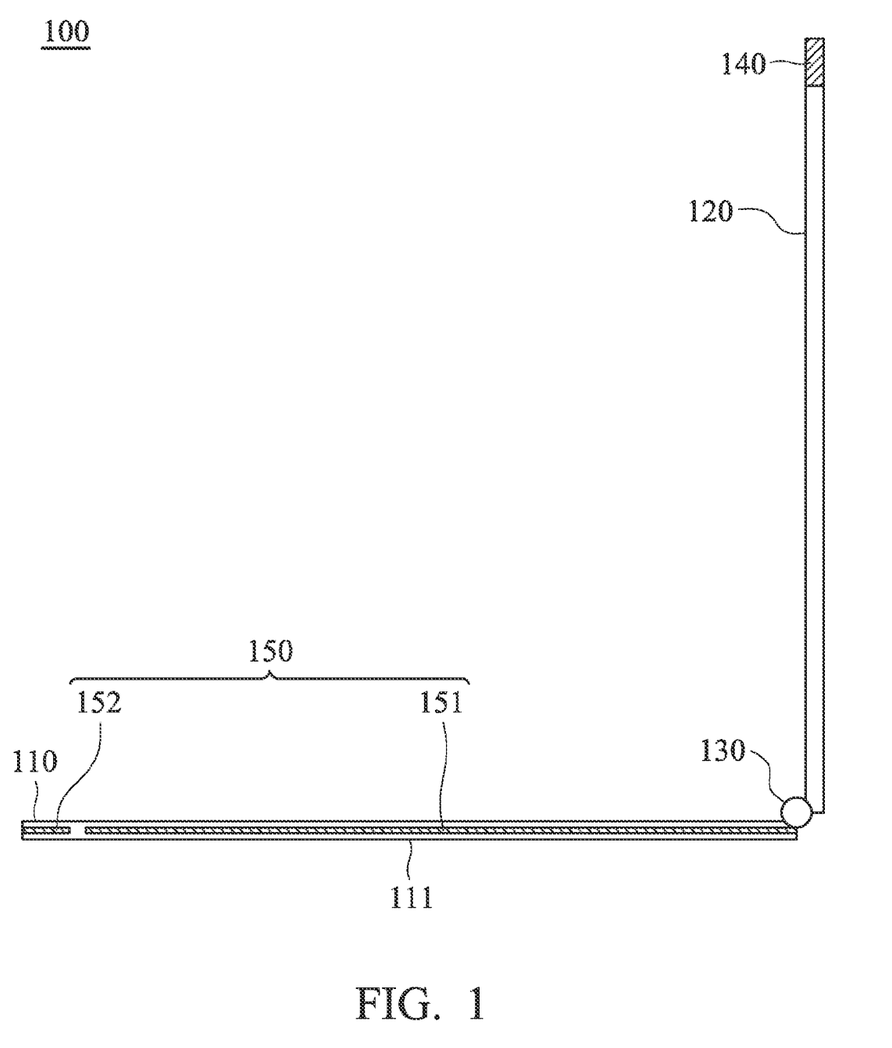
FIG. 1 is a cross-sectional view of a transformable mobile device according to an embodiment of the invention.

FIG. 1 is a cross-sectional view of a transformable mobile device 100 according to an embodiment of the invention. The transformable mobile device 100 can operate in a notebook mode or a tablet mode. In the embodiment of FIG. 1, the transformable mobile device 100 operates in the notebook mode. The transformable mobile device 100 at least includes a base 110, an upper cover 120, a hinge 130, a main antenna 140, and a ground metal plane 150. The base 110 is configured to accommodate main control elements of the transformable mobile device 100, such as a processor, a touch control module, a memory device, an SSD (Solid State Disk), and a CD-ROM driver (not shown). The upper cover 120 is configured to accommodate a display device (not shown) of the transformable mobile device 100. The hinge 130 is connected between the base 110 and the upper cover 120. By controlling the hinge 130, the transformable mobile device 100 can switch between the notebook mode and the tablet mode.

The main antenna 140 is disposed in the upper cover 120. The main antenna 140 may be coupled to an RF (Radio Frequency) module (not shown) of the transformable mobile device 100, and configured to transmit or receive wireless signals. The shape and type of the main antenna 140 are not limited in the invention. For example, the main antenna 140 may be a monopole antenna, a dipole antenna, a loop antenna, a patch antenna, a helical antenna, or a chip antenna. In the embodiment of FIG. 1, the ground metal plane 150 is a system ground plane disposed in the base 110. In alternative embodiments, the ground metal plane 150 is a metal back cover of the base 110, and is disposed on an outer surface 111 of the base 110. It should be noted that the ground metal plane 150 includes a main portion 151 and a first float portion 152, and the first float portion 152 is completely separate from the main portion 151. The divided design of the ground metal plane 150 can solve the problem of a conventional antenna tending to be affected by the tablet mode. The proposed design will be described in detail in the following embodiments.

Figure 2:
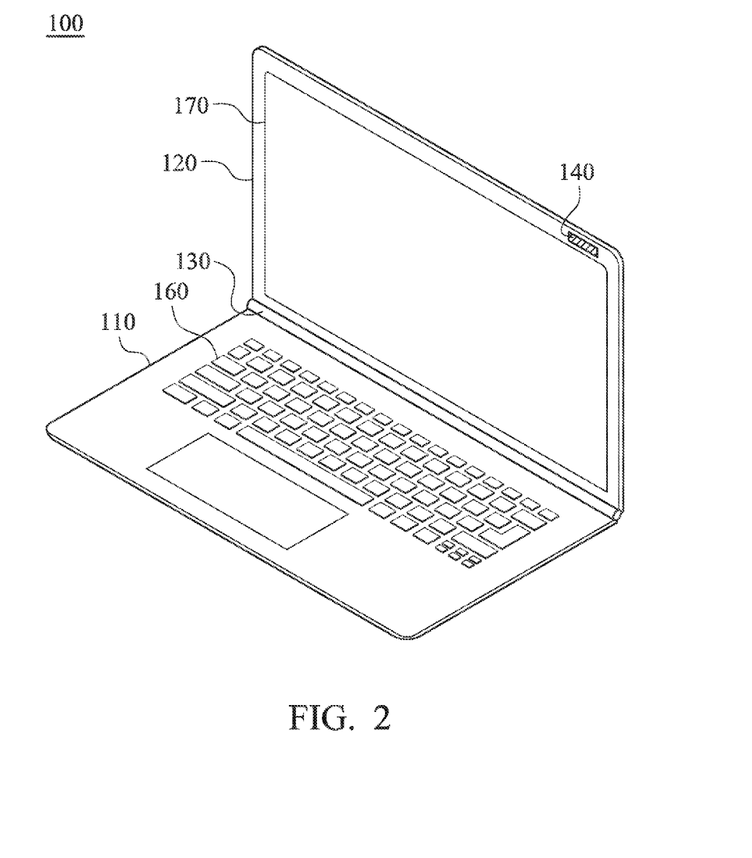
FIG. 2 is a front view of a transformable mobile device according to an embodiment of the invention.

FIG. 2 is a front view of the transformable mobile device 100 according to an embodiment of the invention. In the embodiment of FIG. 2, the base 110 includes a keyboard 160, and the upper cover 120 includes a display device 170. The main antenna 140 is disposed between the display device 170 and an edge of the upper cover 120. In alternative embodiments, the main antenna 140 is disposed at the left side or the right side of the display device 170. The keyboard 160 may be a physical keyboard or a smooth touch control board. The display device 170 may be an LCD (Liquid Crystal Display) embedded in the upper cover 120. The transformable mobile device 100 may include other accessories, such as an external mouse, an external speaker, or an external power supply (not shown).

Figure 3:
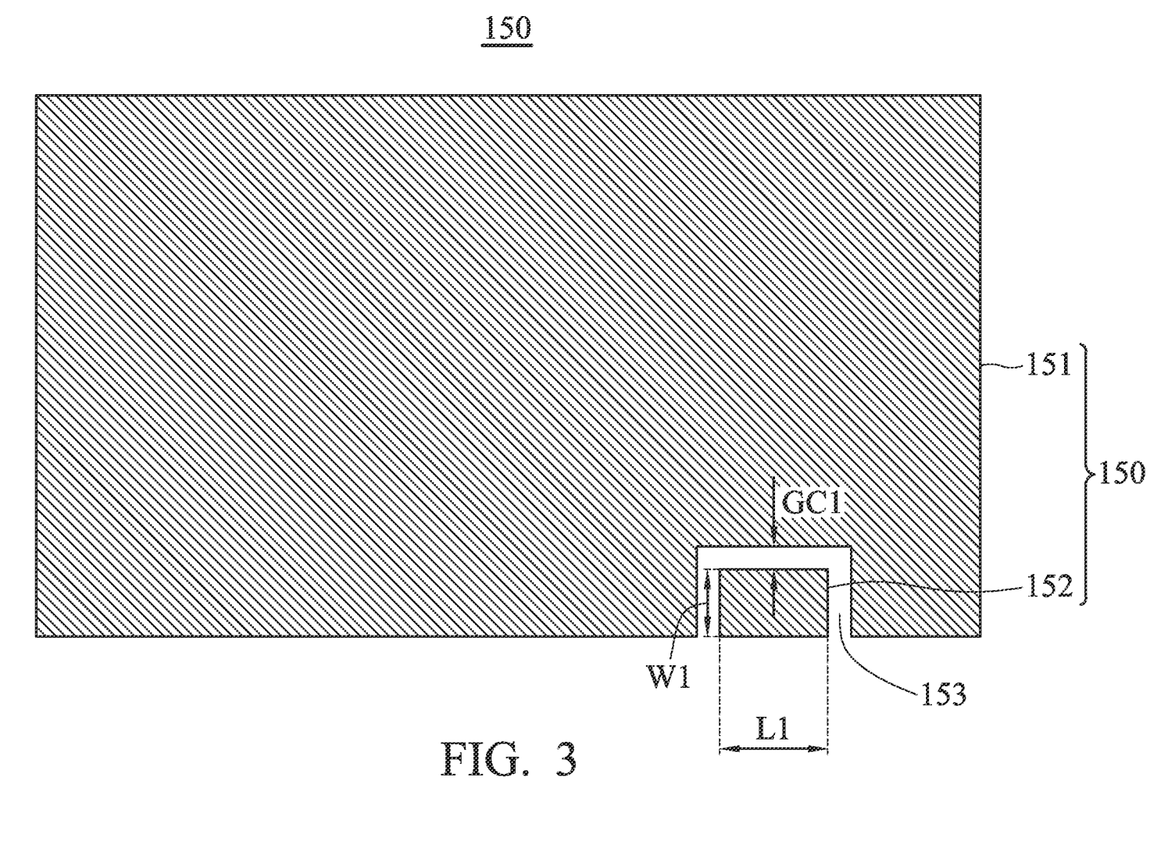
FIG. 3 is a top view of a ground metal element according to an embodiment of the invention.

FIG. 3 is a top view of the ground metal plane 150 according to an embodiment of the invention. The ground metal plane 150 includes a main portion 151 and a first float portion 152, and the first float portion 152 is completely separate from the main portion 151. Specifically, the main portion 151 has a first notch 153. The first notch 153 substantially has a rectangular shape. The first float portion 152 substantially has a relatively small rectangular shape, and is disposed in the first notch 153. A first gap GC1 is formed between the first float portion 152 and the main portion 151. The width of the first gap GC1 is from about 2 mm to about 5 mm. The length L1 of the first float portion 152 is substantially equal to 0.25 wavelength ($\lambda$/4) of a central operation frequency of the main antenna 140. The width W1 of the first float portion 152 is wider than the width of the main antenna 140. With such a design, the first float portion 152 tends to resonate with the main antenna 140, so as to enhance the mutual coupling therebetween.

Figure 4:
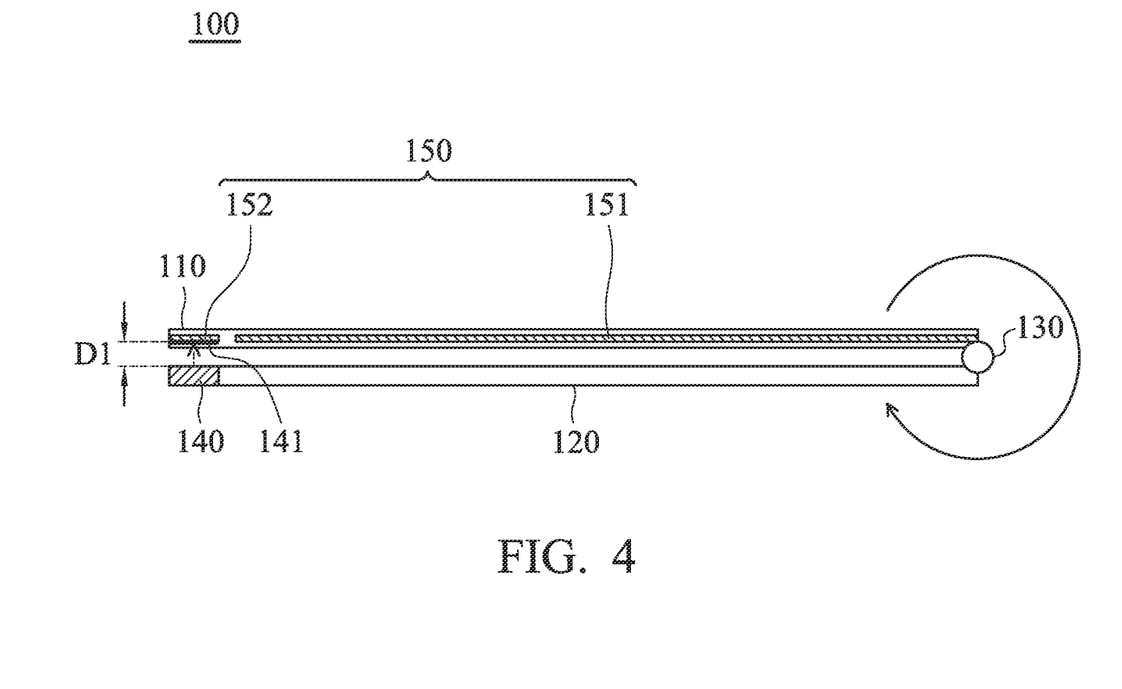
FIG. 4 is a cross-sectional view of a transformable mobile device according to an embodiment of the invention.

FIG. 4 is a cross-sectional view of the transformable mobile device 100 according to an embodiment of the invention. In the embodiment of FIG. 4, the transformable mobile device 100 operates in the tablet mode. Specifically, when the transformable mobile device 100 operates in the tablet mode, the upper cover 120 is rotated to be below the base 110 and to be substantially parallel to the ground metal plane 150, such that the main antenna 140 is close to the first float portion 151 of the ground metal plane 150. For example, the spacing D1 between the main antenna 140 and the first float portion 151 has a minimum value of 3 mm. At this time, the main antenna 140 has a vertical projection 141 on the ground metal plane 150, and the vertical projection 141 is completely inside the first float portion 151 of the ground metal plane 150. Since the first float portion 151 is completely separate from the other portions of the ground metal plane 150, the first float portion 151 is not considered as a ground shield element for the main antenna 140. Conversely, with an appropriate design of element sizes, the mutual coupling is induced between the first float portion 151 and the main antenna 140. As a result, the first float portion 151 can guide the radiation of the main antenna 140 outwardly, thereby enhancing the gain of the main antenna 140.

Figure 5:
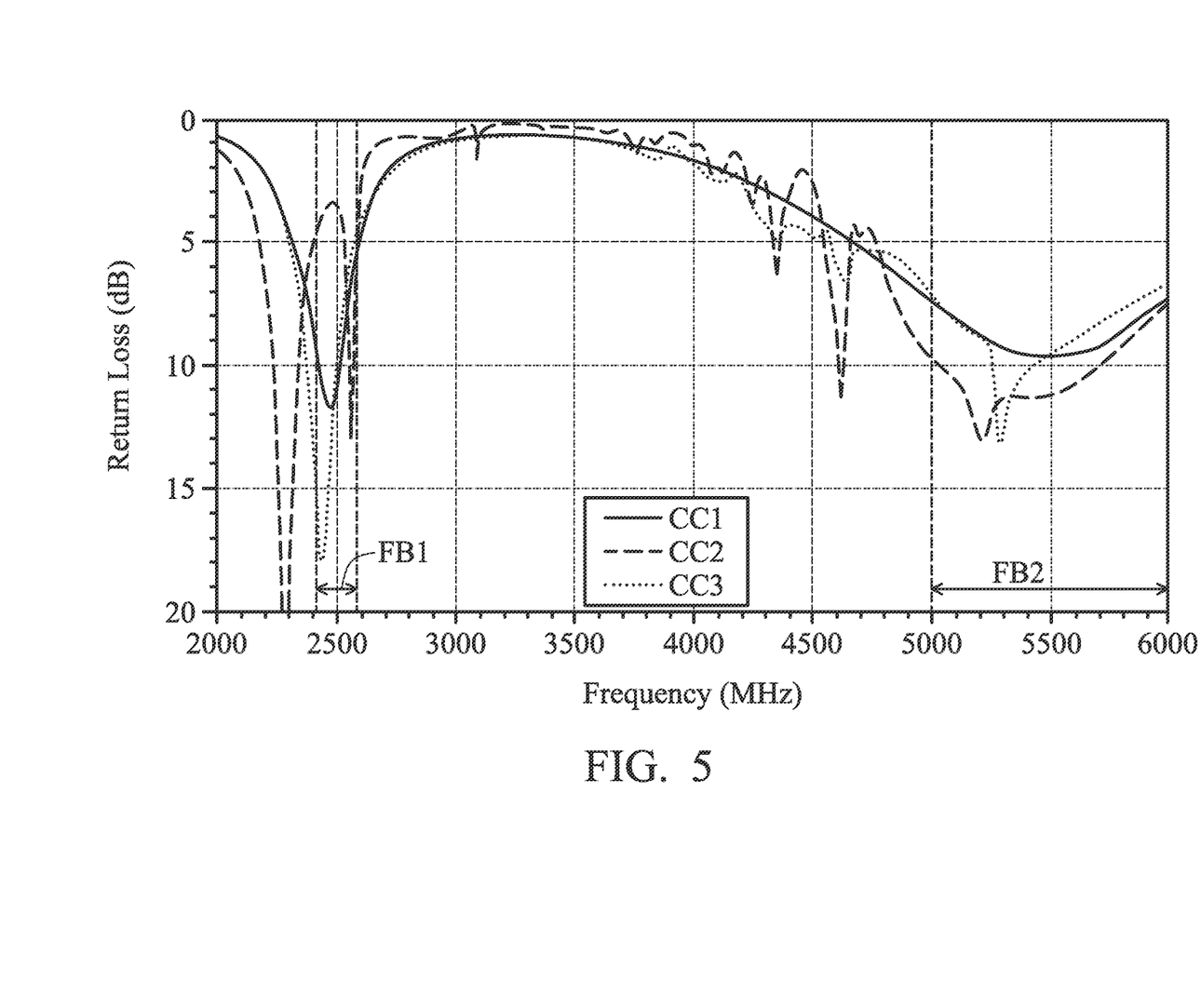
FIG. 5 is a diagram of return loss of a main antenna of a transformable mobile device according to an embodiment of the invention.

FIG. 5 is a diagram of return loss of the main antenna 140 of the transformable mobile device 100 according to an embodiment of the invention. The horizontal axis represents the operation frequency (MHz), and the vertical axis represents the return loss (dB). In the embodiment of FIG. 5, a first curve CC1 represents the characteristic of the main antenna 140 when the transformable mobile device 100 operates in the notebook mode, and a second curve CC2 represents the characteristic of the main antenna 140 when the transformable mobile device 100 operates in the tablet mode. It should be noted that the second curve CC2 is related to the transformable mobile device 100 including a whole ground metal plane without any float portion. According to the measurements of the first curve CC1 and the second curve CC2, the main antenna 140 originally covers the Wi-Fi frequency bands (from about 2400 MHz to about 2484 MHz, and from 5150 MHz to about 5850 MHz) in the notebook mode. However, in the tablet mode, the main antenna 140 is affected by the nearby ground metal plane, and therefore its resonant frequency shifts to the left or the right and away from the desired Wi-Fi frequency band. A third curve CC3 represents the characteristic of the main antenna 140 when the proposed transformable mobile device 100 operates in the tablet mode. It should be noted that the third curve CC3 is related to the transformable mobile device 100 including the ground metal plane 150 with the main portion 151 and the separate first float portion 152, as shown in the embodiment of FIG. 3. According to the measurement of the third curve CC3, the incorporation of the first float portion 152 can make the main antenna 140 cover the original Wi-Fi frequency band, and the main antenna 140 does not tend to be affected by the transformable mobile device 100 switching between the notebook mode and the tablet mode.

Figure 6:
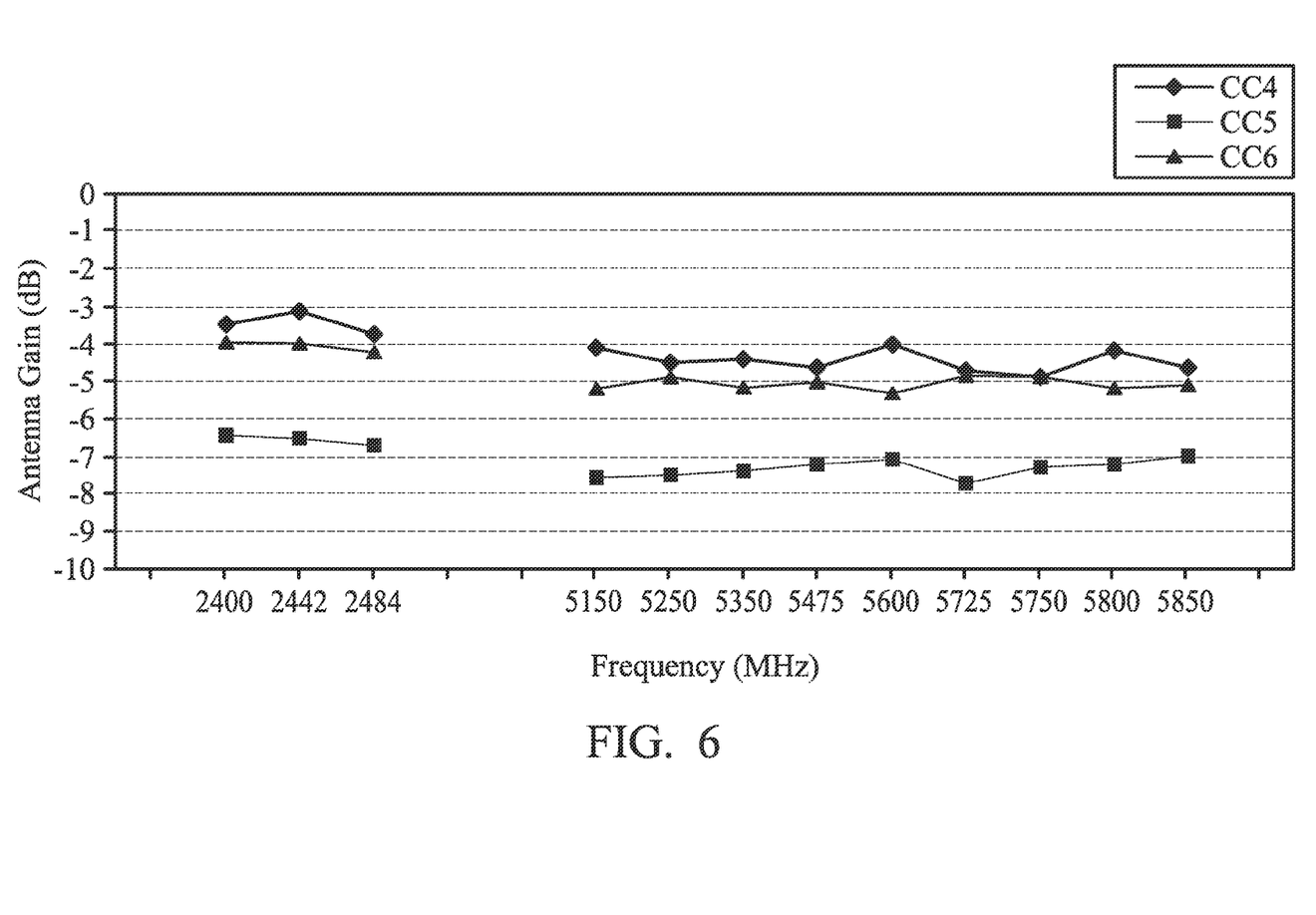
FIG. 6 is a diagram of antenna efficiency of a main antenna of a transformable mobile device according to an embodiment of the invention.

FIG. 6 is a diagram of antenna efficiency of the main antenna 140 of the transformable mobile device 100 according to an embodiment of the invention. The horizontal axis represents the operation frequency (MHz), and the vertical axis represents the antenna efficiency (dB). In the embodiment of FIG. 6, a fourth curve CC4 represents the characteristic of the main antenna 140 when the transformable mobile device 100 operates in the notebook mode, and a fifth curve CC5 and a sixth curve CC6 represent the characteristic of the main antenna 140 when the transformable mobile device 100 operates in the tablet mode. It should be noted that the fifth curve CC5 is related to the transformable mobile device 100 including a whole ground metal plane without any float portion, and the sixth curve CC6 is related to the transformable mobile device 100 including the ground metal plane 150 with the main portion 151 and the separate first float portion 152. According to the measurements of the fourth curve CC4, the fifth curve CC5, and the sixth curve CC6, if the ground metal plane is not divided at all, the antenna efficiency of the main antenna 140 will decrease by about 3 dB due to the transformable mobile device 100 switching from the notebook mode to the tablet mode, but if the ground metal plane 150 is divided into the main portion 151 and the first float portion 152, the antenna efficiency of the transformable mobile device 100 (operating in the tablet mode) is further improved by 2 to 3 dB. Therefore, the incorporation of the first float portion 151 makes the main antenna 140 not affected by the transformable mobile device 100 switching between the notebook mode and the tablet mode.

With the design of the invention, when the transformable mobile device 100 operates in the tablet mode, the spacing D1 between the ground metal plane 150 and the main antenna 140 is reduced to about 3 mm. However, in order to maintain the antenna performance, a conventional transformable notebook computer in the tablet mode has the aforementioned spacing of about 10 mm between the ground metal plane and the antenna. In comparison to the conventional design, the proposed transformable mobile device 100 has the advantages of minimizing the device size, enhancing the antenna gain, and maintaining the antenna bandwidth, and therefore it is suitable for application in a variety of transformable mobile devices with communication functions.

Figure 7:
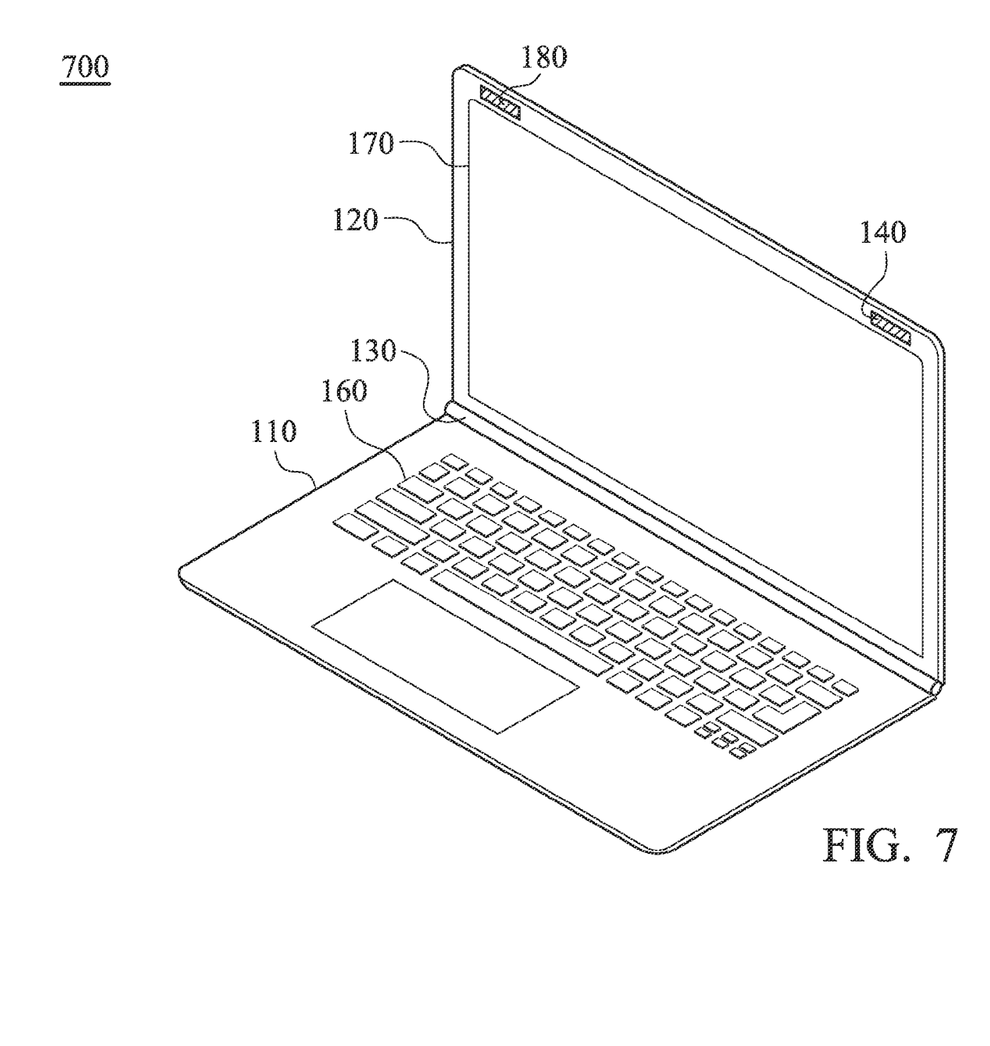
FIG. 7 is a front view of a transformable mobile device according to another embodiment of the invention.

FIG. 7 is a front view of a transformable mobile device 700 according to another embodiment of the invention. FIG. 7 is similar to FIG. 2. The difference between the two embodiments is that the transformable mobile device 700 of FIG. 7 further includes an auxiliary antenna 180. The auxiliary antenna 180 is also disposed in the upper cover 120, and is positioned between the display device 170 and the edge of the upper cover 120. The auxiliary antenna 180 and the main antenna 140 can operate in the same frequency band, such as the Wi-Fi frequency band (from about 2400 MHz to about 2484 MHz, and from about 5150 MHz to about 5850 MHz). Correspondingly, the transformable mobile device 700 includes a ground metal plane 850, as shown in the following embodiment of FIG. 8.

Figure 8:
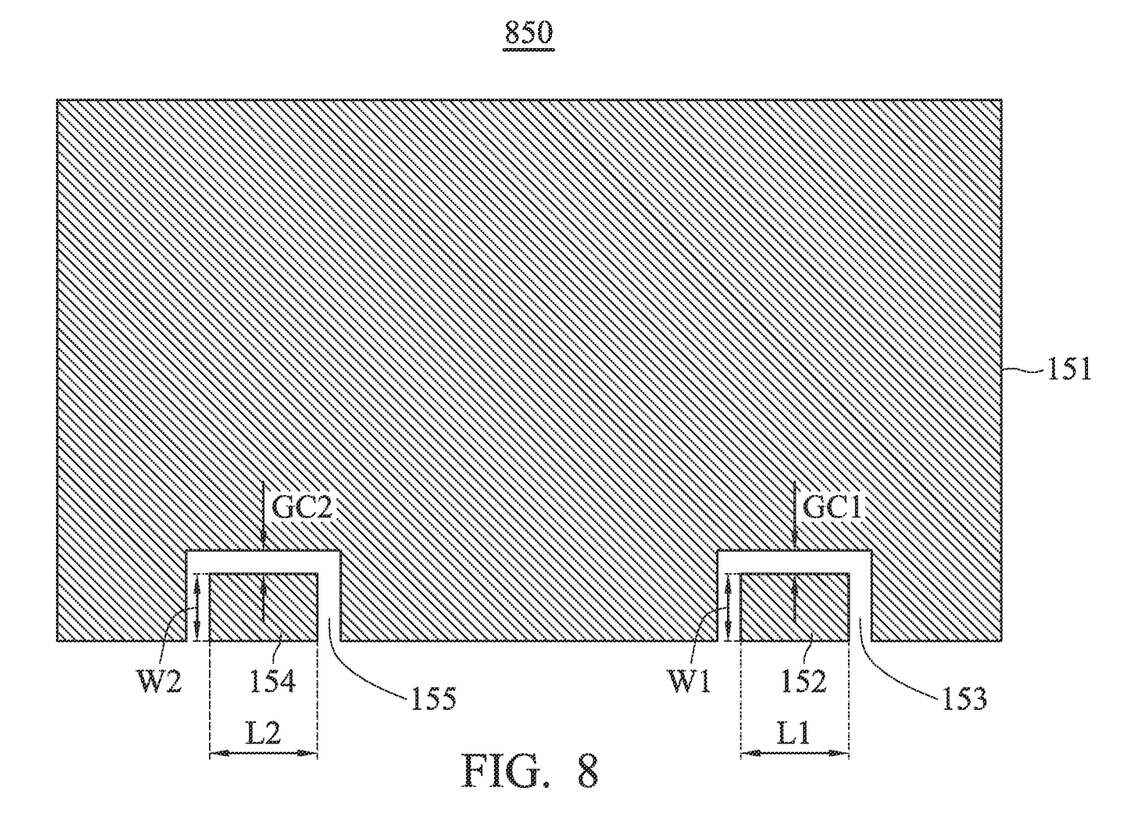
FIG. 8 is a top view of a ground metal plane according to another embodiment of the invention.

FIG. 8 is a top view of the ground metal plane 850 according to another embodiment of the invention. FIG. 8 is similar to FIG. 3. The difference between the two embodiments is that the ground metal plane 850 of FIG. 8 further includes a second float portion 154, and the second float portion 154 is completely separate from the main portion 151. Specifically, the main portion 151 further has a second notch 155. The second notch 155 substantially has a rectangular shape. The second float portion 154 substantially has a relatively small rectangular shape, and is disposed in the second notch 155. A second gap GC2 is formed between the second float portion 154 and the main portion 151. The width of the second gap GC2 is from about 2 mm to about 5 mm. The length L2 of the second float portion 154 is substantially equal to 0.25 wavelength ($\lambda/4$) of a central operation frequency of the auxiliary antenna 180. The width W2 of the second float portion 154 is wider than the width of the auxiliary antenna 180. With such a design, the second float portion 154 tends to resonate with the auxiliary antenna 180, so as to enhance the mutual coupling therebetween. Similarly, when the transformable mobile device 700 operates in the tablet mode, the auxiliary antenna 180 is close to the second float portion 154 of the ground metal plane 850. At this time, the auxiliary antenna 180 has a vertical projection on the ground metal plane 850, and the vertical projection is completely inside the second float portion 154 of the ground metal plane 850. The mutual coupling is induced between the second float portion 154 and the auxiliary antenna 180. The second float portion 154 can guide the radiation of the auxiliary antenna 180 outwardly, thereby enhancing the gain of the auxiliary antenna 180. Other features of the transformable mobile device 700 of FIGS. 7-8 are similar to those of the transformable mobile device 100 of FIGS. 1-4. Accordingly, the two embodiments can achieve similar levels of performance.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A transformable mobile device, operating in a notebook mode or a tablet mode, and comprising:
   a base;
   an upper cover;
   a hinge, connected between the base and the upper cover;
   a main antenna, disposed in the upper cover; and
   a ground metal plane, disposed in the base or on an outer surface of the base, wherein the ground metal plane comprises a main portion and a first float portion, and the first float portion is completely separate from the main portion;
   wherein when the transformable mobile device operates in the tablet mode, the upper cover is rotated to be below the base and to be substantially parallel to the ground metal plane, such that the main antenna is close to the first float portion.

2. The transformable mobile device as claimed in claim 1, wherein the ground metal plane is a metal back cover of the base, or is a system ground plane in the base.

3. The transformable mobile device as claimed in claim 1, wherein the base comprises a keyboard, the upper cover comprises a display device, and the main antenna is disposed between the display device and an edge of the upper cover.

4. The transformable mobile device as claimed in claim 1, wherein a length of the first float portion is substantially equal to 0.25 wavelength of a central operation frequency of the main antenna.

5. The transformable mobile device as claimed in claim 1, wherein when the transformable mobile device operates in the tablet mode, the main antenna has a vertical projection on the ground metal plane, and the vertical projection is completely inside the first float portion.

6. The transformable mobile device as claimed in claim 1, further comprising:
   an auxiliary antenna, disposed in the upper cover;

wherein the ground metal plane further comprises a second float portion, and the second float portion is completely separate from the main portion;

wherein when the transformable mobile device operates in the tablet mode, the upper cover is rotated to be below the base and to be substantially parallel to the ground metal plane, such that the auxiliary antenna is close to the second float portion;

wherein a length of the second float portion is substantially equal to 0.25 wavelength of a central operation frequency of the auxiliary antenna.

7. The transformable mobile device as claimed in claim 6, wherein the main portion further has a second notch, the second float portion is disposed in the second notch, and a width of a second gap between the second float portion and the main portion is from about 2 mm to about 5 mm.

8. A transformable mobile device, operating in a notebook mode or a tablet mode, and comprising:
a base;
an upper cover;
a hinge, connected between the base and the upper cover;
a main antenna, disposed in the upper cover; and
a ground metal plane, disposed in the base or on an outer surface of the base, wherein the ground metal plane comprises a main portion and a first float portion, and the first float portion is completely separate from the main portion, wherein the main portion has a first notch, the first float portion is disposed in the first notch, and a width of a first gap between the first float portion and the main portion is from about 2 mm to about 5 mm.

9. A transformable mobile device, operating in a notebook mode or a tablet mode, and comprising:
a base;
an upper cover;
a hinge, connected between the base and the upper cover;
a main antenna, disposed in the upper cover; and
a ground metal plane, disposed in the base or on an outer surface of the base, wherein the ground metal plane comprises a main portion and a first float portion, and the first float portion is completely separate from the main portion, wherein when the transformable mobile device operates in the tablet mode, mutual coupling is induced between the first float portion and the main antenna, so as to enhance gain of the main antenna.

* * * * *